Patented June 30, 1942

2,287,930

UNITED STATES PATENT OFFICE 2,287,930

PLASTIC MATERIAL

Ralph Canter, Dayton, Ohio, assignor to General Motors Corporation, Detroit, Mich., a corporation of Delaware No Drawing. Application June 9, 1939, Serial No. 278,324

4 Claims. (Cl. 260—15)

This invention relates to plastics and is particularly concerned with plastics of the cellulose acetate type.

It is an object of the invention to provide a cellulose acetate plastic which is substantially non-porous.

In carrying out the above object it is a further object to add thermo-setting resin of the urea formaldehyde type to a thermo plastic, such as cellulose acetate, thereby reducing the porosity of the resultant plastic.

It is a further object to form a cellulose acetate plastic which is impervious to moisture and yet not brittle, such a condition being obtained by the addition of plasticizing agents.

Further objects and advantages of the present invention will be apparent from the following description.

Cellulose acetate plastics are used in the manufacture of a great variety of articles, some of such articles being steering wheels, control knobs, dash panels and the like, as used in connection with automobiles. This plastic is capable of being utilized as a finish and for ease of application is preferably dissolved in a solvent and thus may be sprayed, dipped or brushed on a surface and then upon the evaporation of the solvent it becomes a durable coating having a very pleasing appearance.

Cellulose acetate surfaces have the one disadvantage of being quite porous and brittle thereby being deleteriously affected by moisture in the atmosphere and readily disfigured due to chipping. The present invention proposes the addition of certain compounds to the cellulose acetate whereby the plastic formed is tougher and therefore not brittle and where the plastic is highly impervious to moisture due to the fact that the porosity thereof has been substantially eliminated.

The above characteristics may be obtained in a cellulose acetate plastic by the addition of certain plasticizers which toughen the material and by the addition of a resin of the urea formaldehyde type which substantially eliminates the porosity. Urea formaldehyde resin utilized in proportions of from 5 to 40% by weight of the cellulose acetate used in any one batch will substantially eliminate the porosity of the dried layer and thereby make such layer substantially impervious to moisture in the atmosphere. Plasticizers include such organic reagents as butyl phthalate, ethyl phthallyl ethyl glycollate, methyl phthallyl ethyl glycollate, etc., in varying proportions which may be determined by the desired hardness of the material after drying. Thus, if a hard material is desired, the percentage of plasticizers used should be lower than the preferred percentage as shown in the formula which will follow, or if a quite soft material is desired, the percentage of plasticizer should be increased from the preferred quantity.

A preferred formula for my improved material is as follows:

| | Parts by weight |
|---|---|
| Cellulose acetate | 400 |
| Plasticizer | 60 |
| Solvents | 2840 |
| Urea formaldehyde resin | 80 |

It is apparent that these specific quantities may be varied within a wide range without markedly effecting the desirable qualities of the surfacing compound. In practice I prefer to use solvents selected from the group including acetone, methyl acetate, methyl Cellosolve, etc., either separately or in combination. I also prefer that these solvents be used in combination since acetone, for example, while having the desired solvent action dries too rapidly to permit easy application of the plastic. Methyl Cellosolve on the other hand when combined with the acetone tends to slow down the drying action and permits satisfactory application of the plastic by means of spraying, etc.

In preparing the formula, it is preferred to dissolve 400 parts of the cellulose acetate in 2800 parts of solvent, which solvent is made by combining 2240 parts of the acetone with 560 parts with the methyl Cellosolve. The 80 parts of urea formaldehyde resin are dissolved in 80 parts of acetone and then the two solutions are thoroughly mixed and the 60 parts of plasticizer, such as butyl phthalate, or dibutyl phthalate, is added and mixed therewith. Thus a more specific formula, breaking down the various ingredients thereof, is as follows:

| | | Parts |
|---|---|---|
| Cellulose acetate | | 400 |
| Di-butyl phthalate | | 60 |
| Solvent | Acetone 2240<br>Methyl Cellosolve 560 | 2800 |
| Urea formaldehyde resin | Urea form 80<br>Acetone 80 | 160 |

The use of urea formaldehyde resin in combination with cellulose acetate provides a much more desirable plastic than cellulose acetate per se since the protective coating of plastic compounds, including the urea formaldehyde resin, is impervious to moisture and when used on steering wheels, etc., yields more satisfactory results since in use the plastic is subjected not only to moisture of the atmosphere but to the moisture caused by perspiration on an operator's hands.

The plastic may be compounded in any desirable color by the simple expedient of adding color pigments to the mixture and the finished material may be readily applied to hard rubber, metal and other hard materials used in the construction of automobile bodies and the like and when dry it resembles a molded article of the phenol formaldehyde resin type both in appearance and to the touch.

While the embodiment of the present invention as herein disclosed, constitutes a preferred form, it is to be understood that other forms might be adopted, all coming within the scope of the claims which follow.

What is claimed is as follows:

1. A plastic composition comprising a cellulose acetate base combined with a urea formaldehyde resin, said resin being in proportion between 5 and 40% by weight of cellulose acetate.

2. A plastic composition comprising a base of cellulose acetate having in the order of 20% by weight of urea formaldehyde resin combined therewith.

3. A plastic composition comprising a base of cellulose acetate in combination with an addition agent for reducing the porosity of the cellulose acetate, said addition agent comprising urea formaldehyde resin in proportion of between 5 to 40% by weight of the cellulose acetate.

4. A surfacing material comprising a plastic composition dissolved in a solvent and adapted to form a moisture impervious layer upon evaporation of the solvent, said composition comprising a base of cellulose acetate, a plasticizing agent taken from the group consisting of dibutyl phthalate, butyl phthalate, ethyl phthallyl-ethyl glycollate and methyl phthallyl-ethyl glycollate and urea formaldehyde resin in quantities of from 5 to 40% by weight of the cellulose acetate resin, said urea formaldehyde resin having the function of reducing the porosity and increasing the strength of the dried plastic.

RALPH CANTER.